US012125004B2

(12) United States Patent
Ognjanovic et al.

(10) Patent No.: US 12,125,004 B2
(45) Date of Patent: Oct. 22, 2024

(54) CONFIGURABLE SMART CONTRACT PLATFORM

(71) Applicant: KPMG LLP, New York, NY (US)

(72) Inventors: Nikola G. Ognjanovic, New York, NY (US); Brian Chew, New York, NY (US); David Jarczyk, McHenry, IL (US); Jenny Li, New York, NY (US); Michal Pol, Mahwah, NJ (US)

(73) Assignee: KPMG LLP, New York, NY (US)

( * ) Notice: Subject to any disclaimer, the term of this patent is extended or adjusted under 35 U.S.C. 154(b) by 0 days.

(21) Appl. No.: 17/804,878

(22) Filed: Jun. 1, 2022

(65) Prior Publication Data

US 2023/0394448 A1    Dec. 7, 2023

(51) Int. Cl.
*G06Q 20/06* (2012.01)
(52) U.S. Cl.
CPC ............................. *G06Q 20/0658* (2013.01)
(58) Field of Classification Search
None
See application file for complete search history.

(56) References Cited

U.S. PATENT DOCUMENTS

| | | | |
|---|---|---|---|
| 10,831,452 B1 * | 11/2020 | Hunter | G06N 5/01 |
| 11,100,501 B1 | 8/2021 | Rainey et al. | |
| 11,100,502 B1 | 8/2021 | Rainey et al. | |
| 11,606,442 B2 * | 3/2023 | Mercuri | G06Q 20/065 |
| 11,647,078 B2 * | 5/2023 | Sardesai | H04L 67/535 |
| | | | 725/9 |
| 2018/0091316 A1 * | 3/2018 | Stradling | H04L 9/3297 |
| 2018/0365201 A1 | 12/2018 | Hunn et al. | |
| 2020/0133955 A1 * | 4/2020 | Padmanabhan | G06Q 30/01 |
| 2020/0294128 A1 | 9/2020 | Cella | |
| 2020/0327546 A1 * | 10/2020 | Pennington | G06Q 20/065 |
| 2020/0380624 A1 * | 12/2020 | Turgman | G06Q 20/02 |
| 2020/0394154 A1 * | 12/2020 | Blackshear | H04L 9/0637 |
| 2020/0394159 A1 * | 12/2020 | Hurley | G06Q 20/389 |
| 2020/0394176 A1 * | 12/2020 | Wu | G06F 16/22 |
| 2020/0394177 A1 * | 12/2020 | Maurer | G06F 9/45508 |
| 2020/0396072 A1 * | 12/2020 | Maurer | G06F 16/2379 |
| 2021/0243193 A1 * | 8/2021 | Padmanabhan | G06F 16/252 |
| 2021/0383380 A1 | 12/2021 | Rainey et al. | |

(Continued)

OTHER PUBLICATIONS

A Generic Blockchain-based Exchange Place, IEEE 2020 (Year: 2020).*

(Continued)

*Primary Examiner* — Bruce I Ebersman
(74) *Attorney, Agent, or Firm* — Hunton Andrews Kurth LLP

(57) ABSTRACT

An embodiment of the present invention is directed to a fully self-sufficient and configurable smart contract for private blockchains that eliminates code and updates. An embodiment of the present invention does not rely on multiple smart contracts to handle incoming transactions and data. A configurable smart contract framework of an embodiment of the present invention enables end users to configure and manage various business rules to be applied to transaction data without the need to write smart contract code. These business rules may be stored in the ledger in the form of transaction configuration rules and query presets for full auditability and traceability.

20 Claims, 13 Drawing Sheets

(56) References Cited

U.S. PATENT DOCUMENTS

2022/0083512 A1* 3/2022 Wu .................... G06F 16/9024
2023/0062434 A1* 3/2023 Wagner ................ H04L 9/3247

OTHER PUBLICATIONS

Blockchain-Enabled Smart Contracts: Architecture, Applications, and Future Trends IEEE 2019 (Year: 2020).*
Smart Contracts: Violations, Applications and Comparisons IEEE (Year: 2022).*
Electronic Regulation of Data Sharing and Processing Using Smart Ledger Technologies for Supply-Chain Security IEEE (Year: 2020).*
U.S. Appl. No. 17/653,600, filed Mar. 4, 2022, Ognjanovic et al.
International Searching Authority, PCT International Search Report and Written Opinion, International Application No. PCT/US23/21811, Aug. 4, 2023, pp. 1-9.

* cited by examiner

```
"configObject": {
  "ID",
  "name",
  "parameters", // transaction type or query
  "transactionModel": [],
  "procedures": {
    "transaction": [
      {
        "ID",
        "transformation": [],
        "validation": [],
        "active", // user can turn on/off config objects
        "transactionType": ["create", "update", "delete"], // transaction type for blockchain ledger
        "permissions",
        "options": {
          "outputs": {
            "reports": true,
            "notifications: true
          },
          "other": {}
        },
      }
    ],
    "query": [
      {
        "name",
        "views": [],
        "format": [], //data format
        "return": [],
        "permissions"
      }
    ]
```

Figure 6

```
"transactionModel": {
  "ID",
  "name", #Composite Primary Key
  "systemID", #Composite Primary Key
  "transactionType",
  "linkedModels": [],
  "configObjects": [],
  "attributes": {},
  "permissions"
}
```

Figure 7

```
"transactionObject": {
  "ID",
  "rawData": {},
  "transactionModel": [], #retrieve
transaction model ID using given
name and system ID
  "transactionProcedures": [
    {
      "transactionProcedureID",
      "values": {},
      "report": {}
    },
  ],
  "metadata": {
    "date/time",
    "user",
    "created",
    "updated"
  }
}
```

Figure 8

CONFIGURABLE SMART CONTRACT PLATFORM

CROSS REFERENCE TO RELATED APPLICATIONS

This application is related to Continuation-in-Part (CIP) Application (U.S. application Ser. No. 17/653,600, filed Mar. 4, 2022), which claims priority to U.S. application Ser. No. 17/408,861, filed Aug. 23, 2021, which is a continuation of U.S. application Ser. No. 17/077,593, filed Oct. 22, 2020 and now U.S. Pat. No. 11,100,502, which is a Divisional patent application of U.S. application Ser. No. 16/881,157, filed May 22, 2020 and now U.S. Pat. No. 11,100,501, the complete disclosures of which are incorporated herein by reference.

FIELD OF THE INVENTION

The present invention relates generally to blockchain transactions, and more specifically to systems and methods for implementing a configurable smart contract platform for blockchain transactions.

BACKGROUND

A blockchain provides a distributed ledger system comprising a plurality of nodes that can be used to store different types of information for different applications. The blockchain provides a distributed and cryptographically-verified ledger where trust is established by the distribution of identical copies of the ledger with cryptographic proof of its accuracy to each of the nodes, rather than by a trusted intermediary or central authority. Data is recorded on the blockchain as events that are referred to as "blockchain transactions," which are written into blocks on the chain. Because a blockchain is a distributed system, before adding a transaction to the blockchain ledger, all nodes need to reach a consensus status regarding the validity of the transaction. The blocks are linked together sequentially using a cryptographic hash function. The hash value of the previous block is incorporated into the header of the next block, which enables any changes to a previous block to be detected. In this way, the blockchain provides an immutable record of the transactions recorded in the blocks. Data may be written to or read from a blockchain using a smart contract. A smart contract may comprise coded algorithms stored on the blockchain that execute predefined processes.

Although the use of blockchains has increased dramatically in recent years, there are nonetheless some significant challenges inherent in known systems. One such challenge is a lack of flexibility in blockchain designs. For example, laws and regulations of particular industries may change over time. The information necessary to address a particular business or legal problem today, for example, may be incorrect with respect to future changes in the law. In some industries, the logic that applies laws and regulations to transactions needs to be updated frequently. Known blockchains are not configured to allow existing data structures to be updated with new attributes, while preserving the existing attributes and their values. Furthermore, updates to smart contracts used with blockchains currently require a developer to recode and redeploy the smart contract on all nodes of the blockchain, which is a resource-intensive process.

It would be desirable, therefore, to have systems and methods that could overcome these and other deficiencies of known blockchain systems.

SUMMARY

According to one embodiment, the invention relates to a computer-implemented method for managing a set of rules for transactions on a distributed ledger through a configurable smart contract platform. The method comprises: storing, by a processing device executing a single configurable smart contract, a transaction type as a transaction model in a distributed ledger, wherein the transaction model identifies a source system, the transaction type, one or more linked models, one or more configurations and one or more attributes; storing, by the processing device executing the single configurable smart contract, a configuration object in a configurations portion of the distributed ledger, wherein the configuration object comprises a set of rules for processing the transaction type; receiving, by the processing device executing the single configurable smart contract, incoming transaction data from an external system; performing an action, by the processing device executing the single configurable smart contract, on the incoming transaction data, wherein performing the action comprises: identifying, by the processing device executing the single configurable smart contract, from the incoming transaction data, a transaction identifier associated with the transaction model; querying, by the processing device executing the single configurable smart contract, using the transaction identifier, for a configuration object associated with the transaction model; applying, by the processing device executing the single configurable smart contract, the set of rules from the configuration object to the incoming transaction data; and responsive to the step of applying, generating, by the processing device executing the single configurable smart contract, at least one new transaction object.

According to another embodiment, the invention relates to a computer-implemented system for managing a set of rules for transactions on a distributed ledger through a configurable smart contract platform. The system comprises: a backend API interface that handles incoming requests and connects one or more external systems to the configurable smart contract platform; a distributed ledger that stores at least one configuration object, at least one transaction model, client data and transaction data; and a processing device executing a single configurable smart contract and configured to perform: storing a transaction type as a transaction model in a distributed ledger, wherein the transaction model identifies a source system, the transaction type, one or more linked models, one or more configurations and one or more attributes; storing a configuration object in a configurations portion of the distributed ledger, wherein the configuration object comprises a set of rules for processing the transaction type; receiving incoming transaction data from an external system; performing an action on the incoming transaction data, wherein performing the action comprises: identifying from the incoming transaction data, a transaction identifier associated with the transaction model; querying using the transaction identifier, for a configuration object associated with the transaction model; applying the set of rules from the configuration object to the incoming transaction data; responsive to the step of applying, generating at least one new transaction object.

The computer-implemented methods described herein may be implemented using one or more computer processors, software modules, and electronic memory or storage devices. The invention also relates to computer implemented systems and computer readable media for carrying out the methods described herein.

Exemplary embodiments of the invention can provide a number of advantages. For example, as new information is written to the blockchain, each version of a world state database following a blockchain transaction may contain all the attributes and attribute values recorded in the blockchain transaction log, thus reflecting its current status in real time or near real time. Furthermore, the system and method can obviate the need for parties to share their private/confidential attributes and even entire models with each other, thus resulting in a more efficient approach that maintains privacy/confidentiality of individual attributes. For example, with the use of the generated metadata, the blockchain is able to track, in real time or near real time, how multiple parties interact with the data. Additionally, embodiments of the invention provide a mechanism to more effectively resolve conflicts in shared attributes. Other embodiments described herein can provide advantages such as facilitating the updating of transaction validation criteria without requiring smart contract code to be retrieved and modified, and the creation of a complete audit trail by providing an immutable record on the blockchain as to when a particular rule change was implemented.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 6 illustrates an exemplary configuration object data structure, according to an embodiment of the present invention.

FIG. 7 illustrates an exemplary transaction model data structure, according to an embodiment of the present invention.

FIG. 8 illustrates an exemplary transaction object data structure, according to an embodiment of the present invention.

DETAILED DESCRIPTION OF EMBODIMENTS

The following description of embodiments provides non-limiting examples to describe features and teachings of different aspects of the invention. The embodiments described herein are not intended to be limiting as to the scope of the invention, but rather are intended to provide examples of the components, use, and operation of the invention. The embodiments described herein should be recognized as capable of implementation separately or in combination with other embodiments of the invention.

Figure 1A:
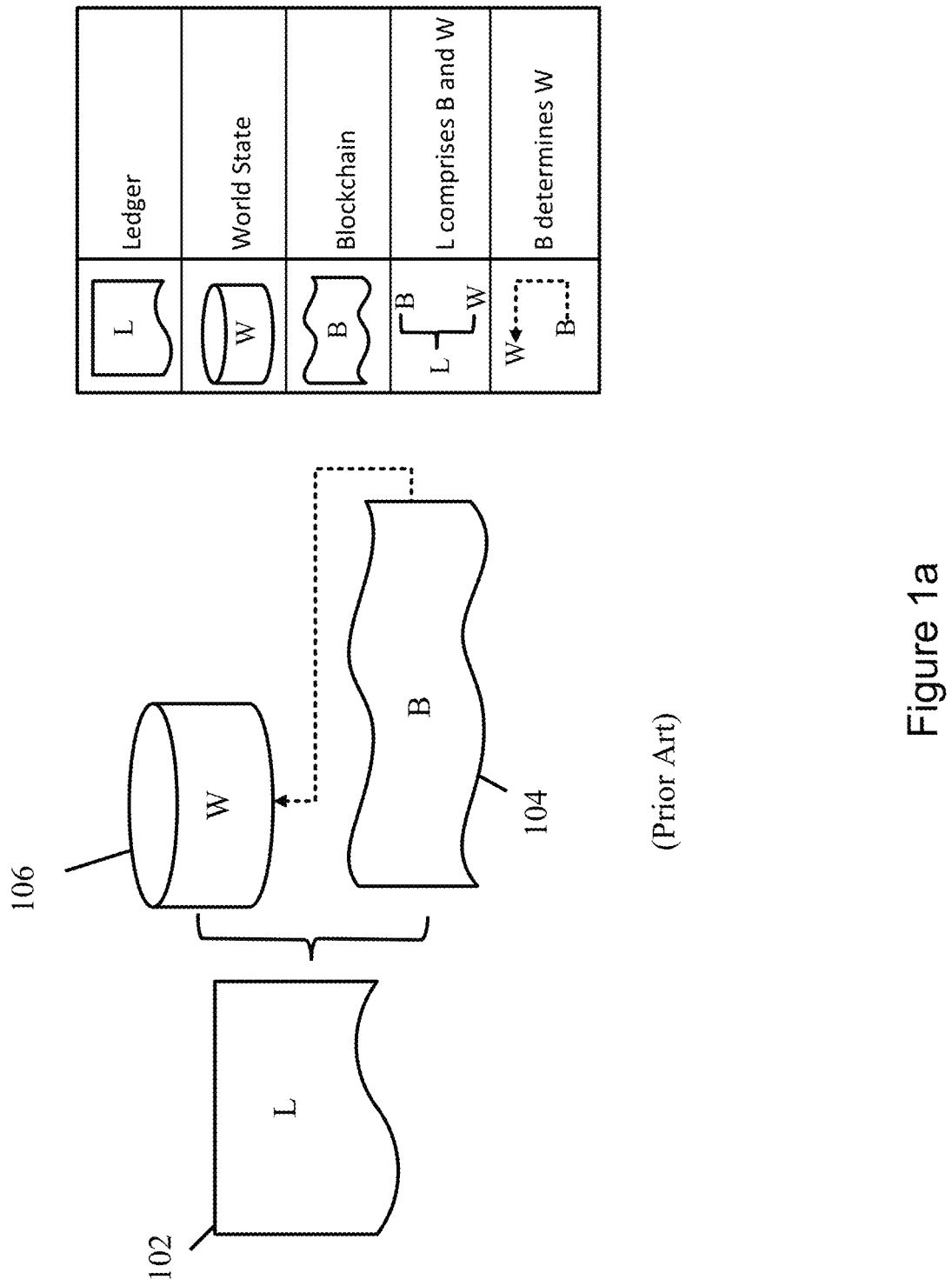
FIG. 1a is a diagram depicting elements of an existing distributed ledger system that includes a ledger comprising a blockchain and a world state database.

FIG. 1a depicts elements of an existing blockchain-based distributed ledger. In FIG. 1a, the distributed ledger 102 comprises a blockchain 104 and a world state database 106. The blockchain 104 provides an immutable ledger of all blockchain transactions that have occurred, wherein every blockchain transaction is reflected as an object recorded to the blockchain in a block. An object may comprise, for example, a set of attributes and attribute values. Each block in the blockchain may reference an object key that acts as an identifier for associated transactions referencing the same object key. The world state database 106 sits on the blockchain 104 and holds all the current values for a given object key. As such, the content of world state database 106 changes over time as new transactions reference the same object key. In this way, the world state database 106 may be regarded as a snapshot of blockchain 104 that shows the current state and attribute values associated with a particular object key.

The existing distributed ledger structure shown in FIG. 1a, which comprises a ledger, blockchain and world state, can be used for various applications according to exemplary embodiments of the invention which will now be described. According to one example use case, consider a commercial sale involving Party A, Party B and Party C that is recorded in one or more blockchain transactions referenced by an object key 1234. The object key 1234 is a public key that is known to the parties in this example (Party A, Party B and Party C). The object key may comprise a data set known to all the parties or a composite of the shared data known by all the parties. In the current example, the blockchain transactions store information related to a purchase and shipment of widgets from Beijing, China to Washington, D.C. In this example, the parties involved may include a customer who has purchased widgets from Beijing and needs them shipped to Washington, D.C. (Party A), a vendor in Beijing who manufactures the widgets (Party B), and the shipper in Beijing who ships the widgets from Beijing to Washington, D.C. (Party C). In this example, the object key comprises a uniquely assigned purchase order number or a combination of purchase order numbers and part numbers. The object key can be used to identify the blockchain-based transactions conducted among the three parties.

As used herein, the term "data object" may refer to an event, a series of events, a tangible or intangible asset, a service, a product, a commercial transaction such as a sale, an input, an interaction between two parties or entities, a performance, a liability, equity, calories, or other entity, object, action, or occurrence or combination thereof. Hence, in the example above, the commercial sale and shipment of widgets from Beijing to Washington, D.C. may comprise one example of a data object. Of course, exemplary embodiments of the invention may involve defining data objects to reference many other types of actions, entities, or concepts.

Referring again to the example involving a commercial sale of widgets, the data object may include one or more related attributes that are related to the data object. In this example, the attributes may comprise both party-specific and shared attributes associated with the object key 1234. The term "attribute" generally refers to a characteristic or data that describes an aspect of the data object. In the foregoing example, in the case of Party A (the customer purchasing the widgets) relevant party-specific attributes for the commercial sale (data object) may include part number (attribute A1), vendor name (attribute A2), and vendor number (attribute A3). In the case of Party B (the widget manufacturer), relevant party-specific attributes for the sale may include invoice number (attribute B1), invoice date (attribute B2) and customer number (attribute B3). In the case of Party C (shipper), relevant party-specific attributes for the sale may include bill of lading number (attribute C1), bill of lading date (attribute C2) and consignee (attribute C3). The shared data object-related attributes that are common among the parties may include quantity (attribute S1), price (attribute S2) and purchase order number (attribute S3).

According to an embodiment of the invention, a distributed ledger is provided that includes modularly designed smart contracts that permit the addition of new attributes without overwriting the old attributes. The modular design of the smart contracts preserves, in a current version of the world state database, all data object-related attribute values provided to the blockchain, thus reflecting the current status of the data object, including all attributes and attribute values, in real time or near real time. Because the smart contracts are modular in design, they enable the compilation of all party-specific attributes into the world state database without requiring any party to share its party-specific attributes with another party. Accordingly, modular smart contracts, as provided by preferred embodiments of the invention, preserve the privacy of attributes, only allowing the assigned party to access their own attributes as well as shared attributes, but not the attributes of other parties. Transacting parties involved only submit their own attributes, and the smart contract logic determines what needs to be preserved in each new version of world state database. The modular smart contract logic preserves privacy requirements by controlling the information that may be submitted and/or viewed by each party involved in the transaction while preserving, in the current world state, all data object-related attribute values provided to the blockchain transaction log.

An embodiment of the present invention is directed to a configurable platform that supports various configuration options. With smart contracts, rules may be created dynamically on the blockchain. An embodiment of the present invention supports creating and/or configuring different types of business rules (e.g., validation, attributes, logic, etc.). For example, an embodiment of the present invention may support creating and applying transformation logic which may involve executing a formula that creates a new attribute and then adds the attribute to a dataset.

An embodiment of the present invention may be implemented in an enterprise and/or permissioned blockchain environment. Other environments and architectures may be supported.

An embodiment of the present invention is directed to a configurable smart contract that enables end users to configure and manage various business rules to be applied to transaction data without the need to write smart contract code. These business rules may be stored in the ledger in the form of transaction configuration rules and query presets for full auditability and traceability.

An embodiment of the present invention is directed to a fully self-sufficient and configurable smart contract for private blockchains that eliminates code and updates. While some systems require multiple smart contracts, an embodiment of the present invention implements a single configurable smart contract that dynamically identifies and applies configured rules. Notably, an embodiment of the present invention does not rely on multiple smart contracts to handle incoming transactions and data. Rather, the configurable smart contract of an embodiment of the present invention manages and applies validations and other rules that may be configured without writing code or any dependencies on additional smart contracts.

There may be instances and scenarios where additional smart contracts would need to be created and integrated with a configurable smart contract. This may occur when new use cases are added to existing smart contracts. This framework, however, relies on the existence of other additional smart contracts. Further, users are required to write smart contract code for specific use cases to accept new transactions going to a distributed ledger, such as a blockchain ledger. This is particularly applicable for already developed and existing smart contracts where rules processing and validation may be performed (or outsourced) to an additional smart contract. For each new use case or transaction, users would need to create a new smart contract which would involve a developer to code and deploy the smart contract. The smart contract would then be configured through rules via the framework, the details of which are provided in related application U.S. application Ser. No. 17/653,600, filed Mar. 4, 2022, which claims priority to U.S. application Ser. No. 17/408,861, filed Aug. 23, 2021, which is a continuation of U.S. application Ser. No. 17/077,593, filed Oct. 22, 2020 and now U.S. Pat. No. 11,100,502, which is a Divisional patent application of U.S. application Ser. No. 16/881,157, filed May 22, 2020 and now U.S. Pat. No. 11,100,501, the complete disclosures of which are incorporated herein by reference. With an existing network with active smart contracts, additional smart contracts may be integrated through code into the existing ecosystem. An embodiment of the present invention, however, does not rely on existence of any other smart contracts.

With an embodiment of the present invention, users may configure various rules, including business rules, validation rules, etc., through a single configurable smart contract with no dependencies on additional smart contracts. The single configurable smart contract may support various use cases, applications, queries, etc. With an embodiment of the present invention, various aspects of the smart contract may be configurable including data models. Data models may define attributes, types of attributes, types of acceptable transactions, types of queries, permissions and/or other rules.

The configurable smart contract platform provides efficiency, simplicity and flexibility. If the smart contract is deployed on a large network with many participants working together, the process to write new smart contract code and then re-deploy on the network would take weeks and require extensive resources. This process would also require security review, production environments and deployment on different nodes and environments. By not requiring new code, an embodiment of the present invention avoids redeployment and the associated efforts and resources while realizing the benefits of a blockchain including a full auditable trail where an entire history of edits and changes are saved on the blockchain and made available.

An embodiment of the present invention is directed to a collaborative user interface that is integrated with the configurable smart contract. For example, a user may interact with the smart contract through a user interface to define models for new transaction types. The smart contracts may be configured in various ways, including through a no-code user interface. According to another embodiment, a user may call the smart contract directly to make configurations, without having to interact with a user interface.

The smart contract may accept new types of transactions and data, without a need to write new code. Accordingly, a user may start onboarding new data for a new use case without having to re-write code or perform additional set-up. By eliminating the requirement to develop and write smart contract code, an embodiment of the present invention is able to deploy smart contracts only once. With an embodiment of the present invention, maintenance and deployment are significantly simplified. Moreover, on the business side, users may develop rules on their own without needing experienced coders and developers.

Figure 1B:
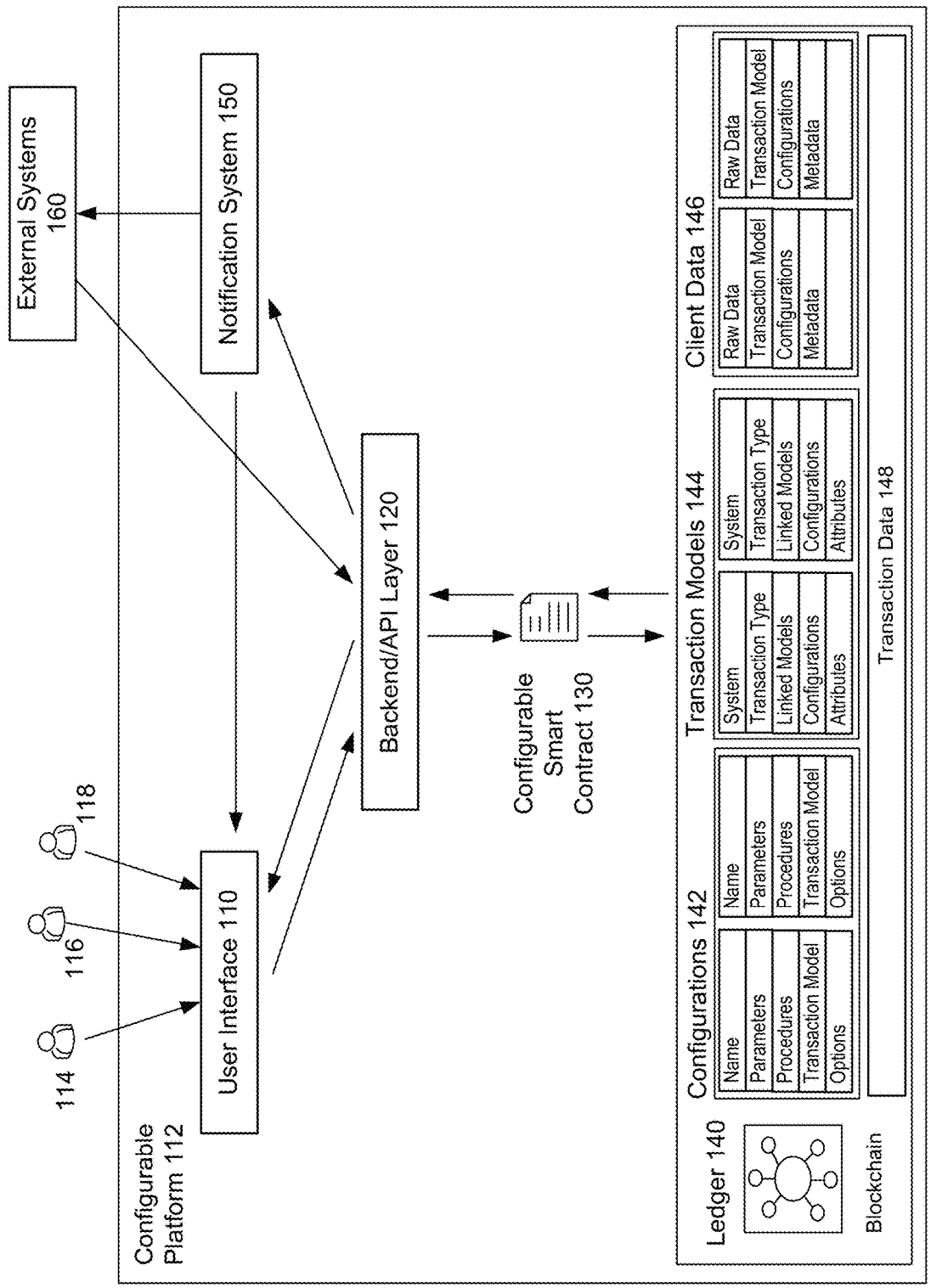
FIG. 1b is an exemplary system diagram, according to an embodiment of the present invention.

FIG. 1b is an exemplary system diagram, according to an embodiment of the present invention. Configurable Platform 112 may support interactions from various users represented by 114, 116 and 118. Configurable Platform 112 may include various modules, functions and components such as User Interface 110, Backend/API Layer 120, Configurable Smart Contract 130, Ledger 140 and Notification System 150. Modules and components are illustrative and do not limit the various embodiments of the present invention. While FIG. 1b illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals.

The system 100 of FIG. 1b may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

As shown in FIG. 1b, User Interface 110 enables a user to interact with Configurable Platform 112. Users may perform various functions including: create, update, and/or delete configurations and queries; manage configurations and queries (e.g., collection of rules); connect to external systems via API; select which configurations to apply to incoming transactions; view transaction reports; view notifications; view their data; and perform analytics.

As shown in FIG. 1b, User Interface 110 enables users to create configuration objects and further configure rules and rule sets to be applied to their data. This provides a no code interface where programming experience is not required. The user interface enables users to submit parameters that would then be used to format an API call which then accesses the configurable smart contract. An embodiment of the present invention enables users to create transaction models and configurations through an user interface, without having to rely on developer tools. With an embodiment of the present invention, Configurable Smart Contract 130 accesses Ledger 140 and applies appropriate logic specific to the user to perform the necessary processing.

An embodiment of the present invention makes functionality configurable through a single smart contract. Configurations may be made by users through a no-code user interface and then saved in a ledger as data objects. The single smart contract may include default code that enables it to manage configurations as well as process and save transactional data. With an embodiment of the present invention, some or all aspects of the smart contract may be configurable through an interactive user interface. Accordingly, the smart contract may be deployed once where updates would not be necessary (unless improvements are being made).

Configurable features may include: data models; types of transactions and associated workflows; queries and multi-organizational rules, permissions, etc. A user may configure data models for various transactions that may be accepted across different use cases. In addition, relationships between data models (e.g., relationship between a PO and Invoice) may be identified and configured. Also, a user may configure transactions types and corresponding workflows. For example, when a new purchase order is received from a client system, a workflow may specify the steps that need to be applied before saving it to the ledger. Configurations may relate to validation, business, and transformation rules. Further, queries may be configured. This may relate to predefined views and data formats for the query result. Multi-organizational rules may relate to permissions, access rules, business rules, etc.

An exemplary scenario may involve onboarding a new use case. Instead of having to write code for a new smart contract and connecting that to a configurable smart contract to build rules, an embodiment of the present invention enables users to simply configure various aspects of the use case through an interactive user interface. The user would not be required to write any code. With an embodiment of the present invention, a user may create new data models specific to a use case, define relationships between those data models (e.g., including relationships to existing models, etc.), create any number of different workflows that may be needed for this new use case (e.g., create new PO under b, create new PO under scenario 2, update existing PO, delete PO, etc.), create any number of queries, and finally define rules around user and organizational permissions.

An embodiment of the present invention also supports working directly with the smart contract. In this scenario, a user may create an API request, without having to interact with the user interface. This enables users to access the smart contract and configure various rules directly.

With User Interface 110, a user may perform various functions including updating, creating and deleting configurations and queries. Users may also select which configurations and queries to apply. An embodiment of the present invention provides flexibility and enables users to choose which configurations to apply to which data. With the User Interface 100, users may also view transaction reports and notifications as well as client data and transformed data.

The system of FIG. 1b supports various workflows, including Transaction Configuration Workflows and Transaction Workflows. Transaction configuration workflows relate to creating objects and/or rules through no code. For example, a transaction configuration workflow may relate to query configurations. Transaction workflows relate to processing incoming transaction data.

Backend/API Layer 120 handles incoming requests and establishes connections with external systems represented by External Systems 160. External Systems 160 may represent various client data systems. External systems 160 may process data relating to any type of transaction that needs to be validated or verified. Other processes and functions may be supported.

Configurable Smart Contract 130 creates configurations and queries, applies selected rules to incoming transactions and returns transaction reports, and queries client data based on user-defined parameters.

An embodiment of the present invention is directed to a single configurable smart contract with no dependencies. In addition to being able to configure validation, business and/or other rules, an embodiment of the present invention seeks to extend the configurable smart contract to address functionality without an additional smart contract.

Ledger 140 stores configuration objects, transaction models, client data, and transaction data. Ledger 140 may include Configurations 142, Transaction Models 144, Client Data 146 and Transaction Data 148. Configurations 142 may include data such as name, parameters, procedures, transaction models, options, etc. Transaction Models 144 may include data such as system, transaction type, linked models, configurations, attributes, etc. Client Data 146 may include raw data, transaction model, configurations, metadata, etc.

Metadata may include version number, a timestamp that indicates when the current version was created or updated, an identity of a party and/or user who submitted the current version, etc. Various types of metadata may be managed such as validation metadata which may include attribute values, data types, business rules, etc.

Ledger 140 may represent a distributed ledger, such as a Blockchain Ledger. Ledger 140 may also support Web3 and other technology that integrates blockchain and other distributed ledger technology.

Configuration 142 represents objects that users create. Every object and rule may be stored at Configuration 142.

Transaction Models 144 may be specific for each client. When a client is on-boarded to the system of an embodiment of the present invention, the client may define transaction models. Transaction models may relate to types of transaction such as invoice, purchase order (PO), etc.

Client Data 146 may represent raw client data. This may include data that is directly from the client's external system. Client Data 146 may also include transformed data. Transformed data may represent data that has been transformed through configuration and rules. In addition, there may be different transformed data for each configuration procedure applied. The new transformed data may be stored within the same object. This enables users to access and view data before and after the application of configuration and rules.

According to a non-limiting embodiment, an entity may collect purchase orders for various transactions and customer requests. In this scenario, Client Data 146 may include the actual purchase orders. If an order is placed, a corresponding purchase order may be saved in their system with an identifier. Transaction Models 144 may identify what the PO object should include. For example, a Transaction Model may define attributes such as quantity, data of import, date order was placed, PO identifier, buyer, seller, etc. When configuring a transaction model, a user may specify certain requirements, including a quantity should be a number; a purchase order date should be in month-date-year format, etc. In addition, users may configure links between different Transaction Models. For example, the user may validate a purchase order against an invoice. In this example, the user may define how to connect the purchase order object and the invoice object together.

The user may have an ability to create a link to a pre-existing model as well as create a new model within the same system which will automatically be linked. Links between different systems may be defined by the model owner, who sets the permissions settings to allow attribute/model sharing to specific systems/users. Also, links may be identified through an identifier, such as a model ID.

In addition, links may be added to enable configuration of rules across multiple objects. For example, if PO and Invoice are linked objects and a PO for a specific purchase is already in the ledger, once the corresponding invoice transaction is received, the link will provide instructions for which specific PO corresponds to the new invoice. In this case, it may be the PO Number that is contained in both objects and used as the link. Once the invoice arrives with one of its attributes containing "PO12345" as the PO Number, the smart contract will know to retrieve a single PO from the ledger that has that same PO Number. This type of link will enable rules across data objects. For example, an embodiment of the present invention may check that the "Quantity" in the new invoice transaction matches the "Quantity" that was specified in the PO.

Configurations 142 may define processes to be applied to the purchase orders in this scenario. For example, a user may define a workflow that specifies that when a new PO comes in, a set of rules are to be applied to validate the data, apply transformations, etc.

Another embodiment may include queries. For example, a user may define a set of queries to be applied to all or a subset of purchase orders in the system. With the ability to define various Configurations and Transaction Models, the framework of an embodiment of the present invention may handle various types of data. An embodiment of the present invention may support variations on configurations based on client systems, use cases, applications, etc.

Notification System 150 handles notifications and alerts, which may also be configurable. For example, a notification may be generated for transaction data that failed configuration rules. Other conditions and events may be considered.

An embodiment of the present invention may include an additional Analytics Module. This module may perform analytics on client data and further determine which transactions did not pass through transaction rules. The Analytics Module may be an optional module and flexible in terms of design. For example, the Analytics Module may be designed according to various requirements. Analytics may include graphics (e.g., charts, graphs, etc.) displayed via an interactive user interface. In another embodiment, analytics may include various components to support advanced analytics and insights. This may involve a dedicated database optimized for analytics, machine learning modules, advanced dashboards, etc.

An exemplary illustration may relate to a purchase order (PO) transaction type. For example, a user may initially define purchase orders (POs) as a transaction type. The platform may then recognize the transaction type as a transaction model stored in the ledger. Configuration objects may include rules and queries for the purchase orders. Rules may include validation rules, business rules and/or other transformation logic. An embodiment of the present invention may support various rules configurations, including defining a sequence of rules, conditional logic (if A, then execute this rule B), etc. The rules may be stored in the configuration object.

The Configurable Platform of an embodiment of the present invention may identify purchase order data from an external system. The Configurable Smart Contract may identify the incoming data as purchase order data from a specific client, e.g., client A. Using the identifying data, the Configurable Smart Contract may then access the ledger and identify a configuration object for the received purchase order data specific to the client. The configuration object may identify specific rules defined by the user to be applied to the incoming data. After the rules are applied to the data, the new object may be created and then stored in the ledger, within the client data portion, for example. Depending on the rules applied, there may be multiple instances of the transformed data to be stored. For example, there may be three different rules or procedures applied to the data resulting in three different outcomes and three different types of data associated with a same object. The transformed data and the raw data may be stored in the client data portion of the ledger. The configuration object may also define whether any reports, notifications or other communications should apply. If so, such data may be provided to a Notification System and then provided to the user via User Interface. Other forms of communication may be supported.

Users may also specify permissions identifying who can set-up an object and perform other actions. An embodiment of the present invention may be deployed on a shared network with multiple parties. In such a shared network, users may retain ownership over transaction models and configurations. For example, when a query is defined for a PO, the owner may restrict access to prevent others on the network from querying or taking other actions. An embodiment of the present invention provides permissions to other network participants to use, modify and/or perform other actions.

The exemplary system of FIG. 1b may be applied to a various architectures and implementations. An embodiment of the present invention may support a distributed platform or network where different parties may share data and validate data against each other. Another embodiment of the present invention may further support a user interface where various users, including different parties, may collaborate on rules, logic, attributes, etc. In a multi-party scenario, various counterparties may interact with rules using the same (or similar) user interface. This allows parties to efficiently collaborate on a set of rules.

For example, a user interface of an embodiment of the present invention enables a manufacturer and a supplier to collaborate as well as configure rules and other features. In this example, a manufacturer in the US and a supplier in Asia may access a user interface using their blockchain identities and collaborate on certain transaction types. This may also involve configurating rules, e.g., validation rules for each transaction type. For example, an entity may give another entity permission to view purchase order rules while receiving permission to view the other entity's invoice rules. In addition, an embodiment of the present invention may support different workflows, review and approval processes, audit trails and other advanced features to facilitate the collaboration. This avoids having to transform data to match another entity's data in an effort to validate data and maintain consistency.

Figure 2:
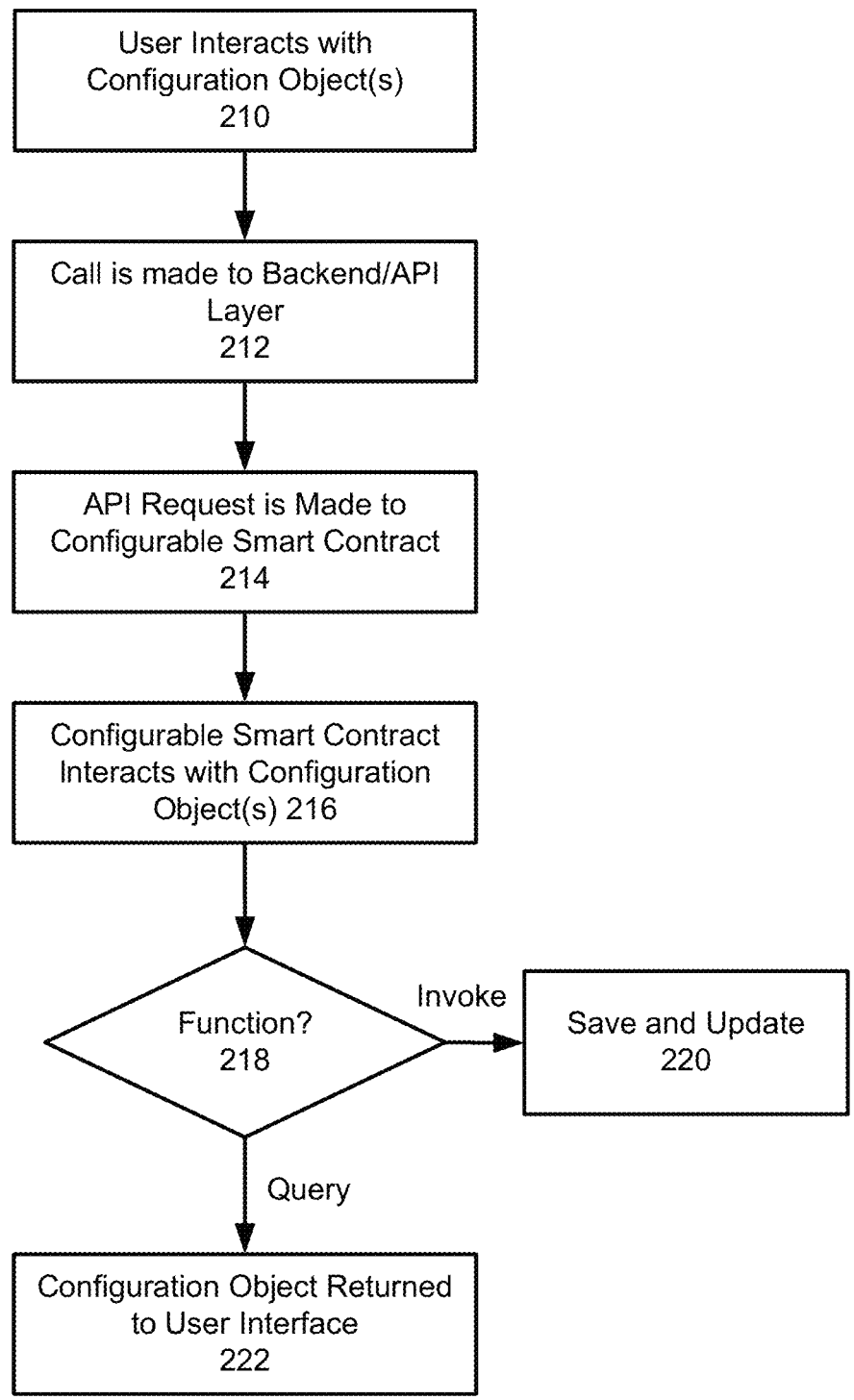
FIG. 2 is an exemplary flowchart, according to an embodiment of the present invention.

FIG. 2 is an exemplary flowchart, according to an embodiment of the present invention. FIG. 2 illustrates a transaction configuration workflow. At step 210, users create, update and/or delete configuration objects and/or queries. At step 212, a call is made to the backend. At step 214, an API request is made to the smart contract. At step 216, Configurable Smart Contract adds/updates/deletes configuration object. At step 218, a particular function may be executed. If invoke function, a new transaction and the updated configuration object is saved in the ledger at step 220. If Query, configuration object may be returned to the user interface at step 222. For Query, users may query data based on query name and parameters defined in their configuration objects. A call is made to the backend. An API request is made to the smart contract. Configurable Smart Contract may return data in pre-defined views and data format as specified in the configuration object. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

An embodiment of the present invention enables users to configure various queries. This may involve providing pre-defined or preset views as well as specific datatypes or data formats for query responses or outputs. Query configurations may be saved as part of the configuration object. For example, with an embodiment of the present invention, a user may define preset queries through views. This may include customizing data format and specifying parameters that should be returned.

Figure 3:
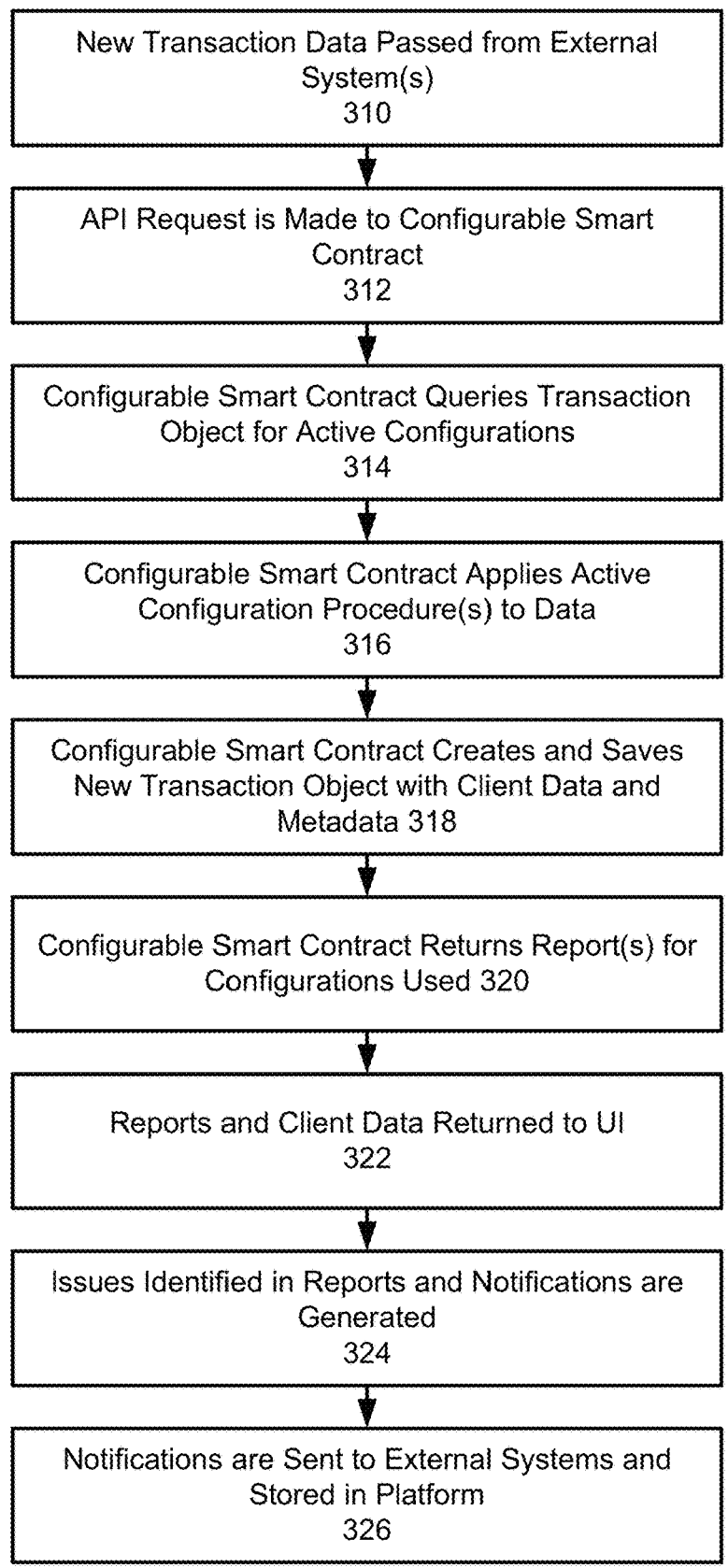
FIG. 3 is an exemplary flowchart, according to an embodiment of the present invention.

FIG. 3 is an exemplary flowchart, according to an embodiment of the present invention. FIG. 3 illustrates a transaction workflow. At step 310, new transaction data may be passed in from external systems. The transaction data may also be stored in client data section of the Ledger. At step 312, an API request is made to the smart contract. Data from client external systems may be transmitted to the Configurable Smart Contract, via Backend/API Layer. At step 314, Configurable Smart Contract queries transaction object for active configurations. For example, Configurable Smart Contract may determine which transaction models apply to the data. At step 316, Configurable Smart Contract applies active configuration procedure(s) to data. Here, appropriate rules and rule sets that were configured by the user may be applied. For example, active configuration procedures may be applied assuming every model only has one configuration object. At step 318, Configurable Smart Contract creates and save new transaction object with client data (both clean and transformed) and metadata. For example, Configurable Smart Contract may create a client data object that contains the data and transformed data resulting from applying the rules and rule sets and configuration. At step 320, Configurable Smart Contract returns report(s) for configurations used. After creating and saving the new object, reports and notifications may be generated and transmitted. At step 322, Reports and Client Data may be returned to the UI. For example, notifications may capture whether any data did not pass through configuration or something went wrong with transaction workflow. At step 324, issues may be identified within reports and notifications may be generated. At step 326, notifications may be sent to external systems and stored in the platform. While the process of FIG. 3 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

Figure 4:
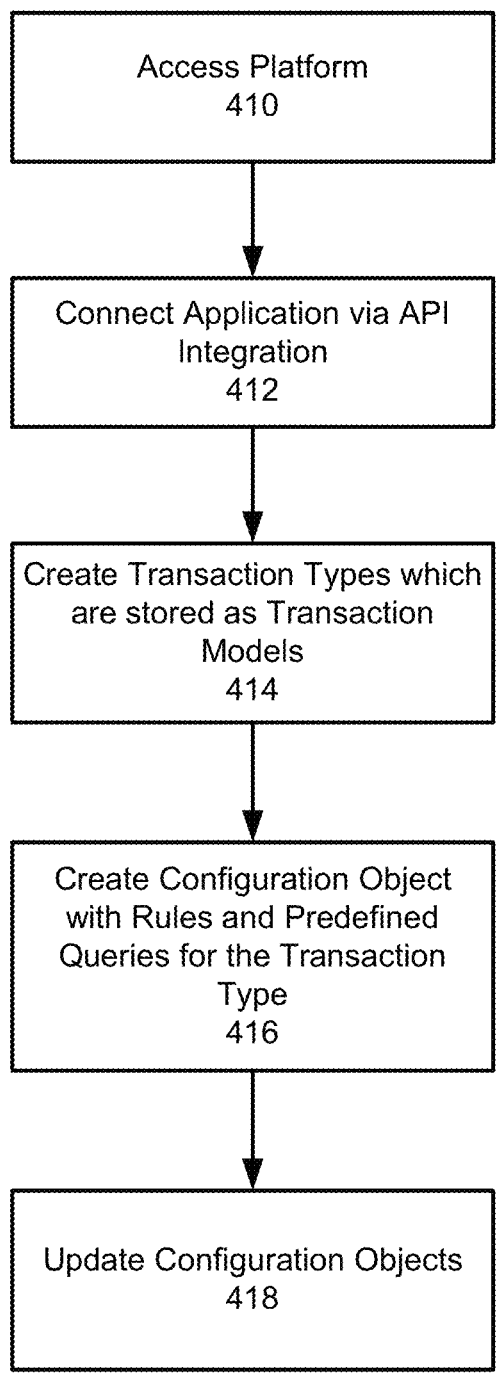
FIG. 4 is an exemplary flowchart, according to an embodiment of the present invention.

FIG. 4 is an exemplary flowchart, according to an embodiment of the present invention. FIG. 4 illustrates an initial system integrations workflow. For example, the workflow illustrates how external systems may be integrated with a Configurable Platform, according to an embodiment of the present invention. At step 410, a user may access a platform. This may involve an authentication process. At step 412, the user may connect their application via an API Integration. At step 414, the user may create transaction types in the system which are stored as transaction models. Transaction types may correspond to transaction models. When creating a transaction type, the user may be prompted to pass in sample data of selected/various data formats. The smart contract may transform the different types of data formats into JSON which may be stored in the model as "attributes." The user may also be allowed to specify relationships between models. At 416, the user may have the opportunity to create a configuration object with rules and pre-defined queries for the transaction type. After creating the transaction model, the user may create a configuration object referring to the transaction models. Generally, there is a one-to one relationship between configuration object and model where every transaction type will have a configuration object. Other relationships may be supported. At step 418, the user may update these configuration objects (add additional transaction rules or pre-defined queries) at a later time by selecting pre-existing transaction types. While the process of FIG. 4 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

According to an exemplary embodiment, each transaction model may refer to a specific transaction type. For example, transaction types may include invoices, purchase orders, as well as various other transaction data. In this example, purchase orders will have a corresponding transaction model and invoices will have another different corresponding transaction model. In addition, transaction models may each have their own configuration object. For example, a specific transaction type may have more than one transaction model if the user sees fit. Transaction Models may be uniquely identified through a user defined name and transaction type. For example, Invoice Transaction Type may have two different transaction models with different names in a system and therefore have two configuration objects.

An embodiment of the present invention may support various use cases, applications and scenarios. For example, the system may support multiple purchase orders from different clients or systems. Clients (e.g., Client A, Client B) may each have their own purchase order. Identifying information, such as an associated identifier, may indicate which system or client the PO comes from. While the system may support multiple models for a transaction type, most applications will have a single transaction model for a transaction type.

Figure 5:
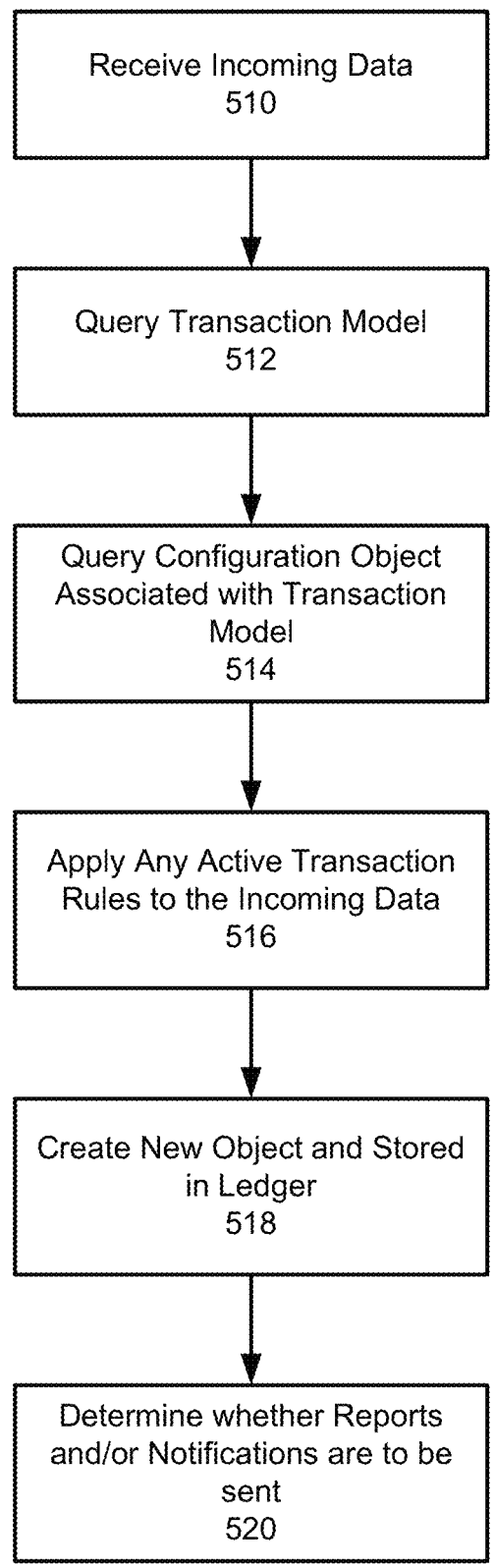
FIG. 5 is an exemplary flowchart, according to an embodiment of the present invention.

FIG. 5 is an exemplary flowchart, according to an embodiment of the present invention. FIG. 5 illustrates an incoming transactions workflow. The workflow of FIG. 5 may relate to incoming transactions and in particular, how the configurable smart contract handles incoming data, including which rules to apply to which transactions.

By examining the incoming data, the system may identify which client and configuration object to apply. At step 510, incoming data may be received from external systems via API through various methods, including Streaming (e.g., Websocket, Polling, etc.), Manual/Batching, Set Intervals, etc. For example, with Set Intervals, a system may retrieve client data at pre-defined time interval, e.g., every hour. The system information that is calling the API may be verified against the existing systems in databases to verify with system/client it is. At step 512, a transaction model may be queried. For example, a Smart Contract may use a system ID and transaction name (provided by client) to query for the transaction model. At step 514, the Smart Contract may query for a configuration object associated with the transaction model. The configuration object may identify which rules (e.g., active rules) to apply to the data. This may be configured and updated by the user. At step 516, any active transaction rules may be applied to the incoming data. At step 518, Smart Contract may create a new object transactionObject and store the transaction model, previous raw data, the transformed data (one for every transaction rule applied), metadata, and report details (one for every transaction rule applied) and store this in the ledger. After apply the rules to the data, a new object may be created and then stored in the ledger. The new object may be stored in the client data section of the ledger. The ledger may contain raw data and transformed data, for every transaction rule that has been applied. Accordingly, there may be multiple transaction rules within the object. The configuration object contains other data including metadata and instructions on notifications and reporting. At step 520, the Smart Contract may look into the configuration object and determine if reports and notifications are to be sent and send accordingly. While the process of FIG. 5 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

When creating/updating a configuration, users may be allowed to specify any transaction rules for incoming data or query parameters for viewing data. For Transactions, users may specify options for a transaction rule such as transformation rules, attribute validation rules, active status, transaction type, and options (reports and notifications). For Queries, users may define preset queries through views, data format, and parameters. For Querying, data may be queried through name and/or parameters, which are both defined by users in the first step. The smart contract may query the ledger and return data in the pre-defined views and data format.

Based on configurations, the configurable smart contract may decide whether any notifications or reports will be sent back to them. The notifications and reports may be configured by the user. The configurations may relate to when the report/notifications are generated, how often, under what conditions, etc. The configurations may be made for each rule or rule sets. For example, notifications may relate to any type of data that did not pass through rules, etc.

An embodiment of the present invention may provide templates to facilitate and simplify rule creation and generation. Generally, transactions may get recorded in an external system first. The system may upload a sample file which may be automatically read and parsed. The sample file may be mapped to a model that may be used to create a template. Users may rely on templates to facilitate the creation of rules in a consistent and efficient manner.

FIG. 6 illustrates an exemplary configuration object data structure, according to an embodiment of the present invention. In this example, a configuration object is defined for a specific transaction type of client data and may be owned by one person or entity. The configuration owner may be able to share transaction rule and/or preset query permissions with other parties. It may be stored in the ledger and include transaction and query procedures for that transaction type.

FIG. 7 illustrates an exemplary transaction model data structure, according to an embodiment of the present invention. A transaction model may refer to a specific transaction type of the client data. Generally, a transaction model may have a one-to-one relationship with a configuration object and may be given shared permission with other parties for cross-model validations by the model owner.

FIG. 8 illustrates an exemplary transaction object data structure, according to an embodiment of the present invention. A transaction object may be created from the configurable smart contract that contains the previous raw client data and all the active transaction procedures applied to it. Each transaction procedure object may contain the transformed data as well as the report of the transaction.

Figure 9:
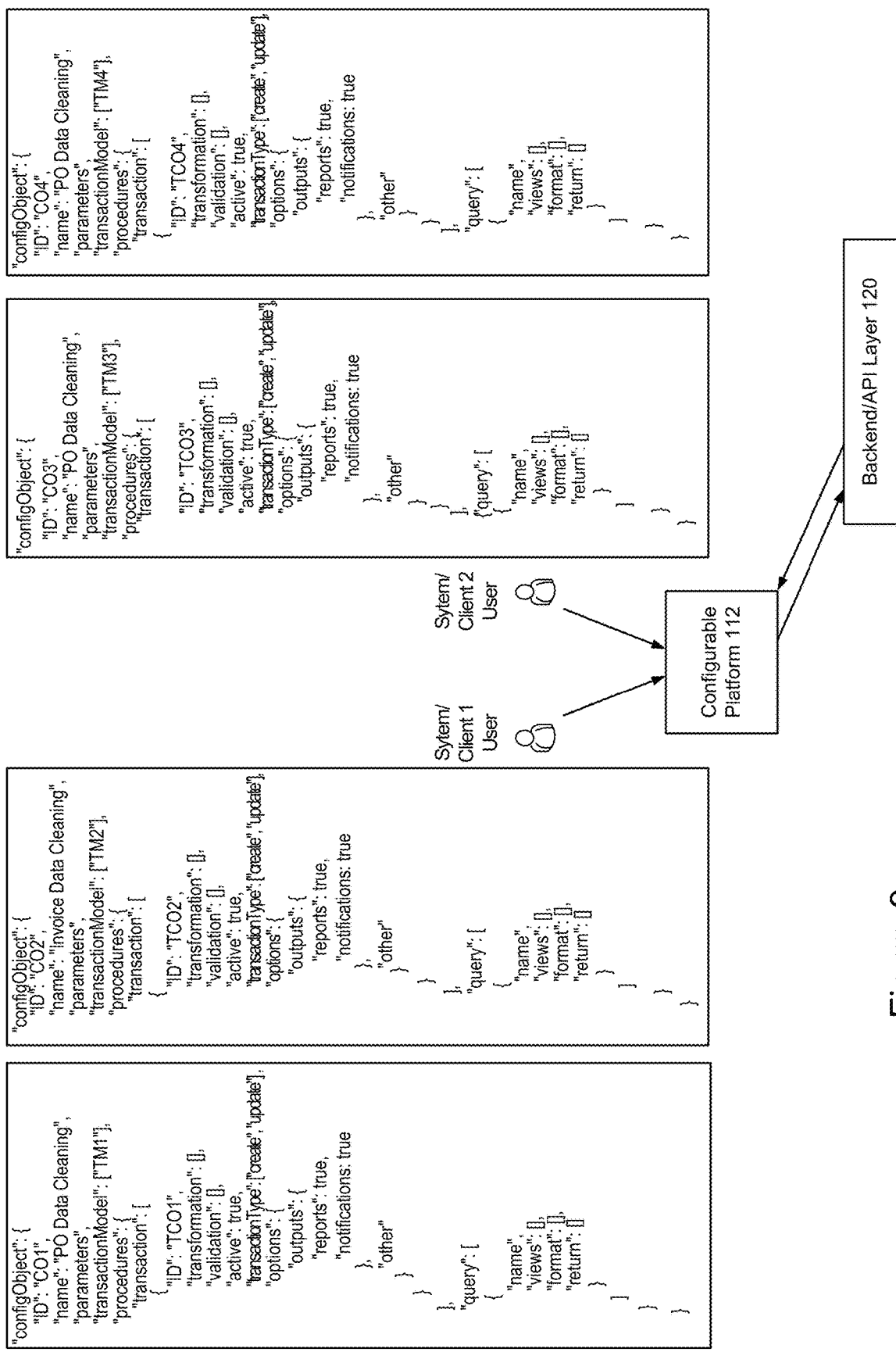
FIG. 9 illustrates exemplary objects, according to an embodiment of the present invention.

FIG. 9 illustrates exemplary objects, according to an embodiment of the present invention. As shown in FIG. 9, User 1 may have a set of configuration objects, identified as CO1 and CO2. User 2 may have another set of configurations, identified as CO3 and CO4. User 1 and User 2 may access Configurable Platform 112 through a user interface or other communication mode. Configurable Platform 112 may interact with Backend/API Layer 120.

Figure 10:
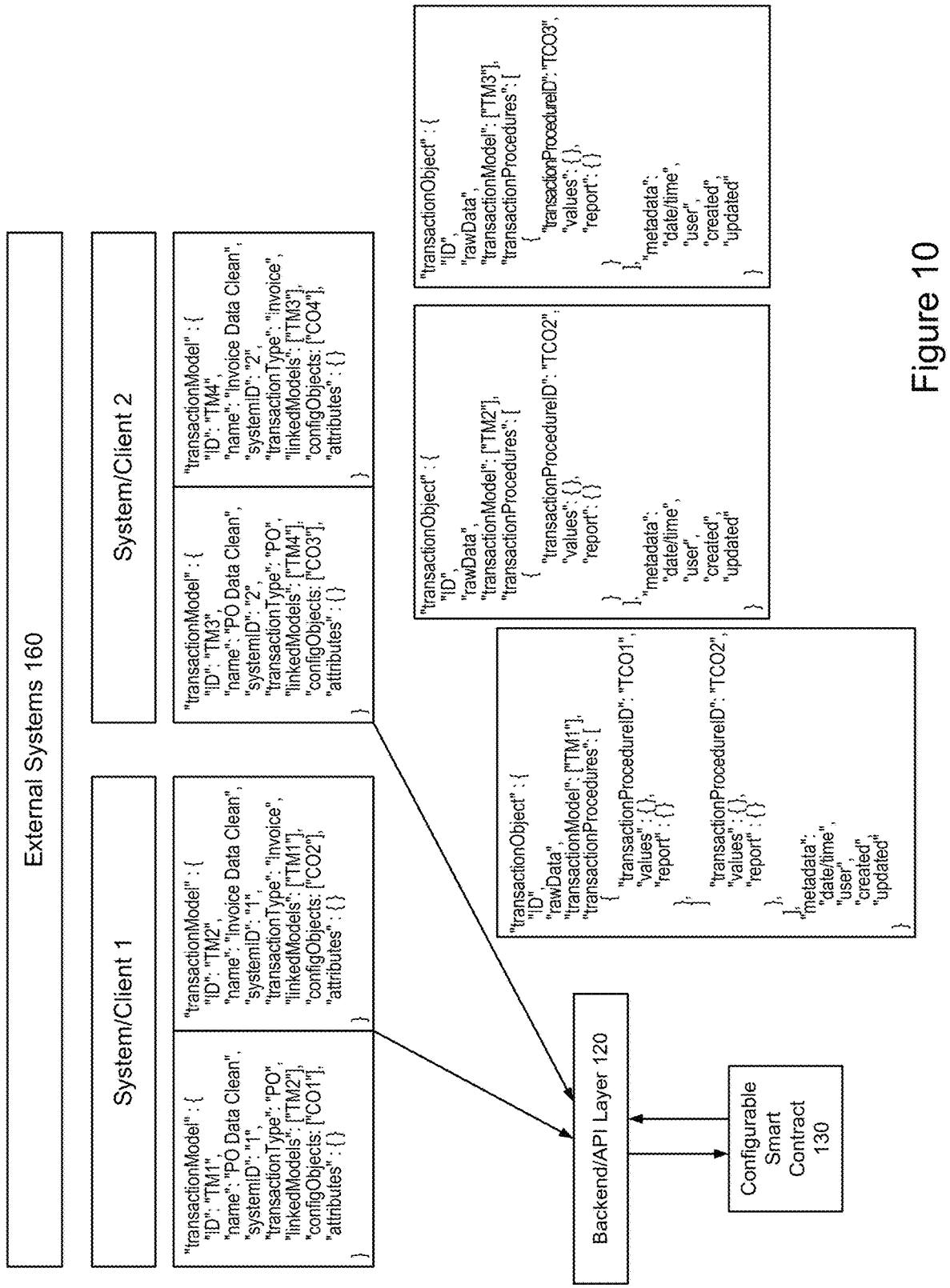
FIG. 10 illustrates exemplary objects, according to an embodiment of the present invention.

FIG. 10 illustrates exemplary objects, according to an embodiment of the present invention. As shown in FIG. 10, External Systems 160 may support various clients, including System/Client 1 and System/Client 2. Each client may have a corresponding set of transaction models. For example, Client 1 may have a set of transaction models, identified as TM1 and TM2. Client 2 may have another set of transaction models, identified as TM3 and TM4. Client 1 and 2 may communicate with Backend/API Layer 120. Transaction objects may be stored in the Client Data section of the distributed ledger which contains the raw and transformed data. FIG. 10 also illustrates a set of transaction objects. Backend/API 120 may exchange data with Configurable Smart Contract 130.

Figure 11:
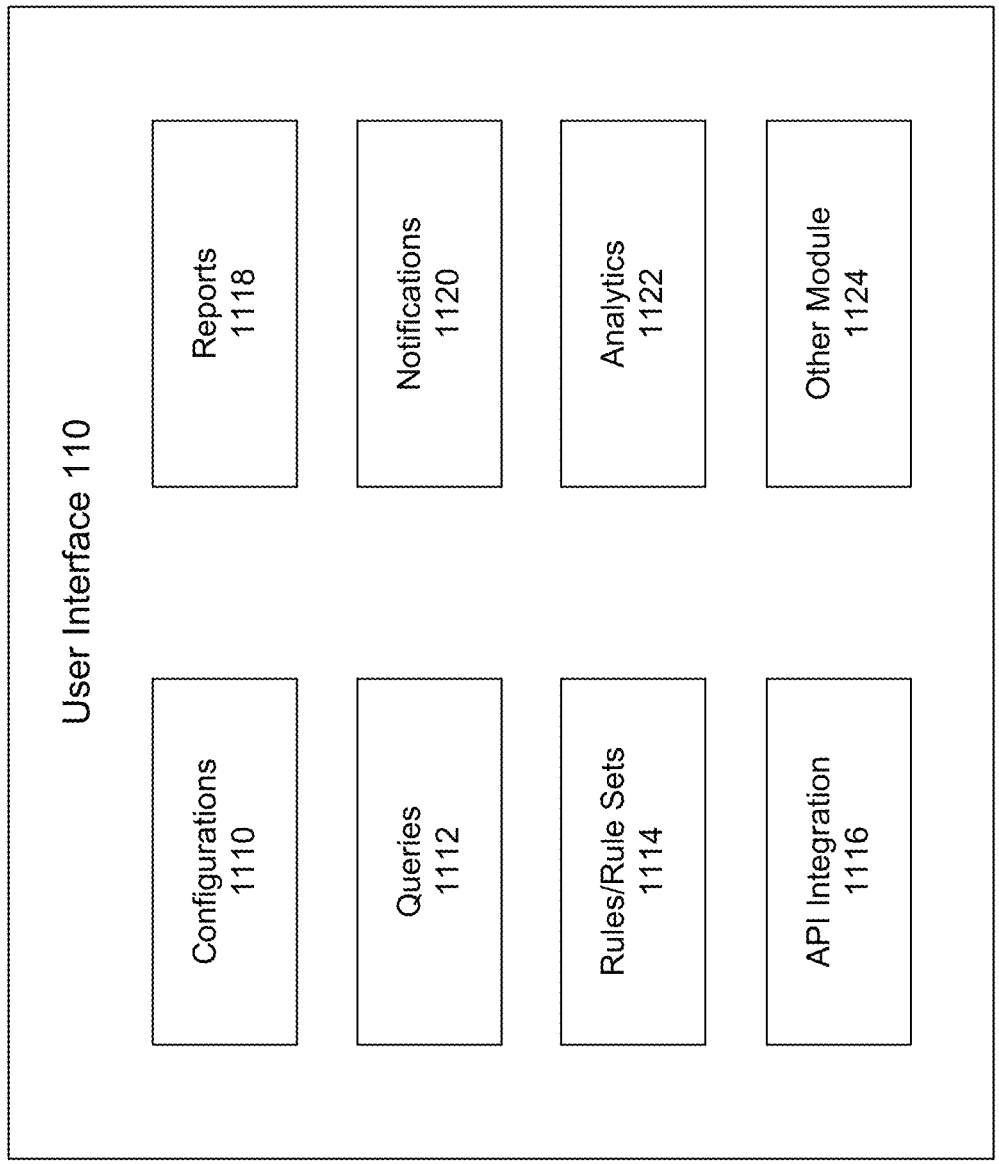
FIG. 11 is an exemplary user interface, according to an embodiment of the present invention.

FIG. 11 is an exemplary user interface, according to an embodiment of the present invention. An embodiment of the present invention is directed to enabling users to create and/or configure rules as data objects, which are saved in a ledger. As discussed above, smart contracts may contain all the necessary rules and corresponding logic. For example, rules and corresponding logic to process the rules in real time in smart contracts may be self-contained on the blockchain. When a new transaction is received, an embodiment of the present invention may access rules from storage and then apply the rules in real time to the transaction. FIG. 11 illustrates an exemplary user interface to configure rules and may support various other use cases, applications, environments, industries, etc.

An embodiment is directed to a user friendly interface that supports configuration of rules. This avoids the need to engage a computer programmer to write code for each smart contract and configuration and/or update. The user interface may support various features including creating workflows, approvals, reviews, processes, etc. The user interface enables the blockchain to be tailored by any user.

According to an embodiment of the present invention, the user interface provides flexibility and may be tailored to support various needs of different organizations. For example, one organization may grant access to the user interface to a limited number of users (e.g., only 5 users) and allow any changes they make to be applied to the blockchain immediately. Another organization may have advanced user access controls at the user interface level where users will have access to rules and models relevant to the data they work with. They may create a workflow that allows an associate to create a new rule, which would go to a manger for review and approval, and finally be sent to a partner who performs a final review and approval. The rule may then be saved to the ledger.

This may also be performed across organizations. For example, a first organization may create a new rule that leverages one of their data models (e.g., purchase order) and a second organization's data model (e.g., invoice). After the first organization creates the rule, it may be shown to appropriate users from the second organization for review and approval. Other workflows may be supported.

In addition, various processes may be created and implemented. For example, users may have an advanced dashboard to manage rules. According to another example, users may send communications (e.g., emails) or push notifications for approvals. Other forms of communication may be integrated.

An embodiment of the present invention may support a variety of transaction types including Purchase Order, Invoice, Bill of Lading, Customs Declaration, Warehouse Receipts, Sales Order, Payment, CFDI (which represents a digital fiscal document through Internet), Advance Shipping Notice, Addition, Adjustment, etc. The types of transactions may be customized for various applications, industries, scenarios, etc.

As shown in FIG. 11, User Interface 110 may include various modules that support user configurations. User Interface 110 may include Configurations 1110, Queries 1112, Rules/Rule Sets 1114, API Integration 1116, Reports 1118, Notifications 1120, Analytics 1122 and other functions and features supported by Other Module 1124. User Interface 110 may support various interactions on devices including mobile devices, other devices, computers, laptops, tablets, etc. In addition, User Interface 110 may support various applications including browsers, mobile interfaces, dashboards, interactive interfaces, etc.

With Configurations 1110, users may create, update, delete and perform other actions relating to configurations. Users may also select which configurations to apply to what transactions, data, etc.

With Queries 1112, users may create, update, delete and perform other actions relating to queries. Users may also select query parameters, output formats, conditions, etc.

With Rules/Rule Sets 1114, users may create, update, delete and perform other actions relating to rules, rule sets, etc. Users may also select which rules or rule sets to apply to what transactions, data, etc.

API Integration 1116 may communicate with one or more external systems, client systems, etc. Other systems and sources of data may be integrated or in communication with User Interface 110.

With Reports 1118, users may view and access various reports, including transaction reports. Reports may be automatically generated and further transmitted to various recipients, receiving systems, etc.

With Notifications 1120, users may view and access notification conditions and perform updates, etc. Notifications may be used to identify failed configuration rules as well as other anomalies and events.

With Analytics 1122, users may perform analytics on client data, transactions, etc.

Figure 12:
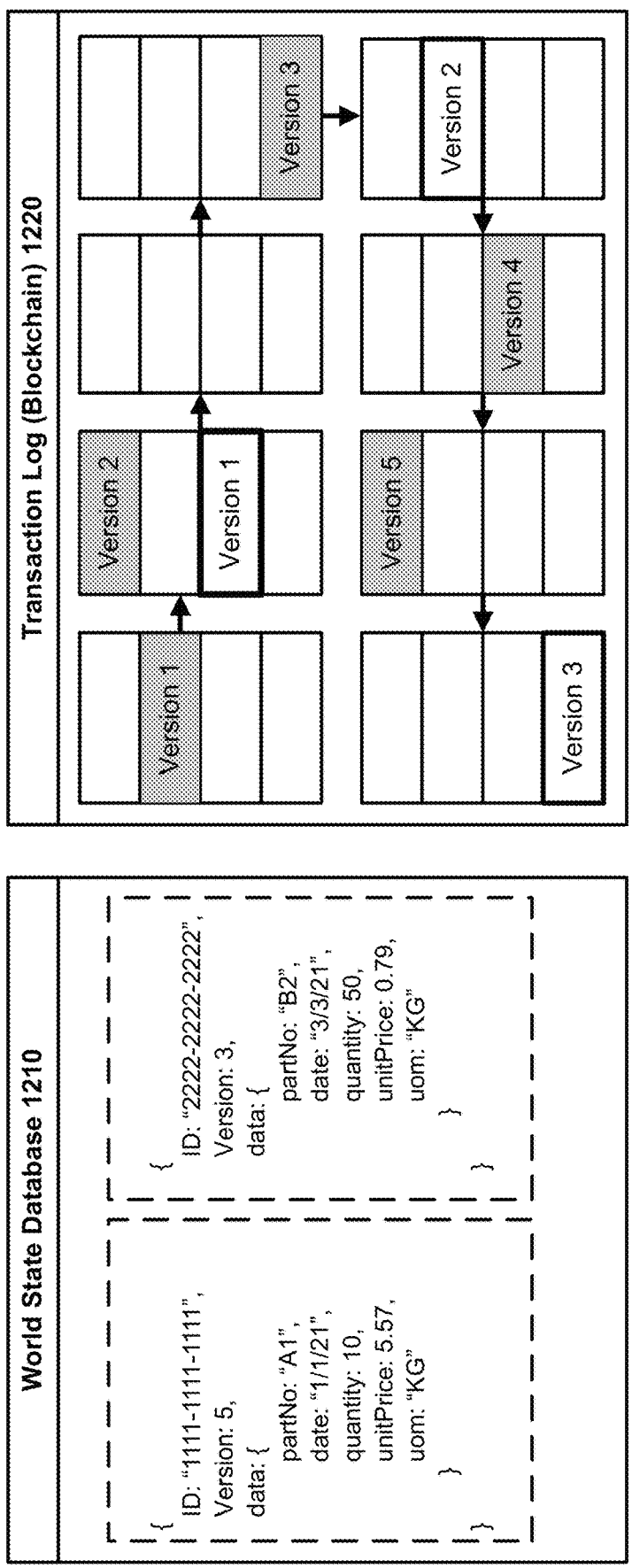
FIG. 12 is an exemplary illustration of a ledger, according to an embodiment of the present invention.

FIG. 12 is an exemplary illustration of a ledger, according to an embodiment of the present invention. A ledger may represent a collection of data objects, each identified by its own unique identifier and version number. Every ledger may include at least two components: a World State Database 1210 and a Transaction Log (Blockchain) 1220.

World State Database 1210 may include a current view of all data objects saved in the ledger, showing only the latest or current versions. Transaction Log (Blockchain) 1220 may represent an immutable, append-only history of transactions that created, modified, and/or deleted data objects in the world state. For example, transactions are ordered and grouped into cryptographically-linked "blocks" by orderers before being distributed and committed to appropriate peers.

In this example, Version 5 data identifies a part number A1 with a quantity of 10. Transaction Log 1220 is an immutable ledger that holds an entire history of the data. Transaction Log 1220 contains the current version but details concerning the earlier versions are also available. The ledger may represent a distributed ledger that holds and manages the data.

According to an embodiment of the present invention, a smart contract may define a set of functions that interact with a ledger in at least two exemplary ways with Query and Invoke. With Query, a transaction reads and returns either the current state or the history of appropriate data objects, based on provided parameters. For example, a query may involve applying a filter and then reading out the data from a ledger. Example queries may include identifying transactions with quantities greater than a threshold number. Query transactions are not saved in the ledger by default, but this can be programmed. In other words, invoke transactions may cause data to be saved in the ledger while query transaction are used to retrieve data from the ledger without actually saving anything. With Invoke, a transaction modifies the state of data objects in the ledger by creating, updating, or deleting them in the world state. For example, an embodiment of Invoke may be used to modify the latest version of the data, e.g., quantity is now 15 which would then create a Version 6. Invoke transactions are saved in the ledger and executing peers may be required to agree on the output.

For example, Hyperledger Fabric smart contracts may be written in Go, Node.js (JavaScript or TypeScript), or Java. Transaction types (e.g., query, invoke, etc.) may be written as functions in a chosen language and may accept parameters from, as well as return data back to, various calling applications. Any type of deterministic logic may be implemented inside these functions to perform validation, data transformation, etc., Currently, rules logic (e.g., validation logic) is written as code inside functions in smart contracts. Writing logic requires knowledge of Go, Node.js, Java or other programming language used to write smart contracts. Any change to the logic requires a new version of that smart contract to be installed on all peer nodes that use it. An embodiment of the present invention recognizes that this can be very challenging and time-consuming, especially in large, multi-organization scenarios. In addition, there is currently no easy way to link data objects in the ledger to the rules they were processed with.

An embodiment of the present invention is directed to a configurable smart contract where rules are saved as their own data objects in the ledger, making them immutable, easily auditable (e.g., full history of changes tracked), and easy to query and modify through external applications.

An embodiment of the present invention is directed to dynamically configuring and/or changing smart contracts through a user interface. The user interface with proper controls may be exposed to technical and non-technical users from a single or multiple organizations to allow them to easily manage their own rules. For example, various rules including validation rules may be configurable. In this example, a validation smart contract accepts incoming data from the original smart contract, queries appropriate validation rules from the ledger, and uses its own parser to apply the rules and return a validation report. An original smart contract no longer needs to be updated with each change to rules, which would result in significant delays and bottlenecks. In addition, real-time or retroactive reports may be easily run against the rules.

An embodiment of the present invention is directed to taking the rules out of the code residing in a smart contract executing on a node and enabling a user to interact directly with the rules through a user interface. For example, the user interface may enable the user to drag and drop icons, text and/or other input to create business rules. This enables a user to create, modify and/or configure various business rules. The rules may then be saved to a blockchain ledger where the ledger is immutable and provides an entire history including previous versions, revisions, etc.

An embodiment of the present invention may be applied to various rules where validation rules represent merely one example. Configurable Smart Contract may support transformations, conditions (e.g., when to release funds), etc. The rules may relate to receiving and processing new transactions, performing queries, managing different permissions, etc.

For example, smart contracts may define functions that may be applied to different types of transactions. For generating a new invoice, a smart contract may have a corresponding function that saves the new invoice and further adds validation logic and rules. According to another example, validation rules may include checking a purchase order date format, identifying required fields, etc. Other rules may be applied to configure attributes, for example. Varying levels of complexities may be applied to rules of all types.

An embodiment of the present invention supports clients in a wide range of industries and applications that need transactional data to be processed, validated, etc. For example, data validation may involve verifying a number of units, e.g., one unit versus 10 units. Another example may involve determining whether an expense qualifies under the tax law as a capitalized expense. Other functions may include providing permissions and/or access to data. Other industries and applications may include ESG (Environmental, Social and Governance) applications, finance, tax, insurance, capital markets, bank loans, etc. An embodiment of the present invention may be applicable to various types of transaction data, without limitation to a specific industry.

For example, incoming data may be missing attributes that will be normally added downstream (e.g., classification, formulas, calculations, etc.). An embodiment of the present invention may be directed to adding, modifying and/or deleting attributes and then saving to the ledger. With an embodiment of the present invention, downstream applications process validated data as opposed to data that will need to be reconciled after the fact.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The system described above can be implemented with servers and other computing devices in various configurations. The various servers and computing devices may use software to execute programs to execute the methods described above. Various embodiments of the invention also relate to the software or computer readable medium containing program instructions for executing the above described methods.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Communications networks connect the various computing devices described above and may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a GPS link, a cellular digital packet data (CDPD) link, a Research in Motion, Limited (RIM) duplex paging type device, a Bluetooth radio link, or an IEEE 802.11-based radio frequency link. Communications networks may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication networks may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript and others. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/ cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for managing a set of rules for transactions on a distributed ledger through a configurable smart contract platform, the method comprising:

receiving, through an application programming interface (API) integration, one or more user-created transaction models for a single configurable smart contract, each transaction model comprising a transaction type and a plurality of attributes for the transaction type;

receiving, through the API, one or more user-specified relationships between the user-created transaction models for the single configurable smart contract;

storing, by a processing device executing the single configurable smart contract, the one or more user-created transaction model for the single configurable smart contract as well as the one or more user-specified relationships;

receiving, through the API, a user-defined configuration object for each of the one or more user-created transaction models for a single configurable smart contract, each configuration object comprising a set of rules and a plurality of predefined queries for processing the transaction type of the transaction model;

storing, by the processing device executing the single configurable smart contract, each user-defined configuration object in a configurations portion of the distributed ledger;

receiving, by the processing device executing the single configurable smart contract, incoming transaction data from an external system;

performing an action, by the processing device executing the single configurable smart contract, on the incoming transaction data, wherein performing the action comprises:

identifying, by the processing device executing the single configurable smart contract, from the incoming transaction data, a transaction identifier associated with the transaction model;

querying, by the processing device executing the single configurable smart contract, using the transaction identifier, for a configuration object associated with the transaction model;

applying, by the processing device executing the single configurable smart contract, the set of rules from the configuration object to the incoming transaction data; and responsive to the step of applying, generating, by the processing device executing the single configurable smart contract, at least one new transaction object, each of the at least one new transaction object comprising clean transaction data, transformed transaction data based on applying the set of rules, and metadata.

2. The method of claim 1, wherein the distributed ledger is part of a permissioned private network.

3. The method of claim 1, wherein the set of rules comprises one or more of: validation rules, transformations, conditions, permissions and access.

4. The method of claim 1, wherein the set of rules are configurable via an interactive no-code user interface.

5. The method of claim 1, wherein the set of rules are configurable directly through an API request to the single configurable smart contract.

6. The method of claim 1, wherein the configuration object further comprises predefined queries for the transaction type.

7. The method of claim 1, wherein the configuration object is defined for a specific transaction type and further comprises one or more transaction procedures and query procedures for the specific transaction type.

8. The method of claim 4, wherein the interactive no-code user interface enables multiple users to collaborate on the set of rules.

9. The method of claim 1, wherein the processing device executing the single configurable smart contract further performs:
   determining whether one or more reports are to be generated and communicated as defined by the configuration object.

10. The method of claim 1, wherein the processing device executing the single configurable smart contract further performs:
    storing, by the processing device executing the single configurable smart contract, the at least one new transaction object and raw client data corresponding to the incoming transaction data in the distributed ledger.

11. A computer-implemented system for managing a set of rules for transactions on a distributed ledger through a configurable smart contract platform, the system comprising:
    a backend API interface that handles incoming requests and connects one or more external systems to the configurable smart contract platform configured to perform:
       receiving one or more user-created transaction models for a single configurable smart contract, each transaction model comprising a transaction type and a plurality of attributes for the transaction type;
       receiving one or more user-specified relationships between the user-created transaction models for the single configurable smart contract; and
       receiving a user-defined configuration object for each of the one or more user-created transaction models for a single configurable smart contract, each configuration object comprising a set of rules and a plurality of predefined queries for processing the transaction type of the transaction model;
    a distributed ledger that stores at least one configuration object, at least one transaction model, client data and transaction data; and
    a processing device executing the single configurable smart contract and configured to perform:
       storing the one or more user-created transaction model for the single configurable smart contract as well as the one or more user-specified relationships;
       storing each user-defined configuration object in a configurations portion of the distributed ledger;
       receiving incoming transaction data from an external system;
       performing an action on the incoming transaction data, wherein performing the action comprises:
          identifying from the incoming transaction data, a transaction identifier associated with the transaction model;
          querying using the transaction identifier, for a configuration object associated with the transaction model;
          applying the set of rules from the configuration object to the incoming transaction data;
          responsive to the step of applying, generating at least one new transaction object, each of the at least one new transaction object comprising clean transaction data, transformed transaction data based on applying the set of rules, and metadata.

12. The system of claim 11, wherein the distributed ledger is part of a permissioned private network.

13. The system of claim 11, wherein the set of rules comprises one or more of: validation rules, transformations, conditions, permissions and access.

14. The system of claim 11, wherein the set of rules are configurable via an interactive no-code user interface.

15. The system of claim 11, wherein the set of rules are configurable directly through an API request to the single configurable smart contract.

16. The system of claim 11, wherein the configuration object further comprises predefined queries for the transaction type.

17. The system of claim 11, wherein the configuration object is defined for a specific transaction type and further comprises one or more transaction procedures and query procedures for the specific transaction type.

18. The system of claim 14, wherein the interactive no-code user interface enables multiple users to collaborate on the set of rules.

19. The system of claim 11, wherein the processing device executing the single configurable smart contract further performs:
    determining whether one or more reports are to be generated and communicated as defined by the configuration object.

20. The system of claim 11, wherein the processing device executing the single configurable smart contract further performs:
    storing, by the processing device executing the single configurable smart contract, the at least one new transaction object and raw client data corresponding to the incoming transaction data in the distributed ledger.

* * * * *